I. W. BRÖGGER.
ELECTRICAL MEASURING INSTRUMENT.
APPLICATION FILED MAR. 22, 1913.
1,141,523.
Patented June 1, 1915.
3 SHEETS—SHEET 1.
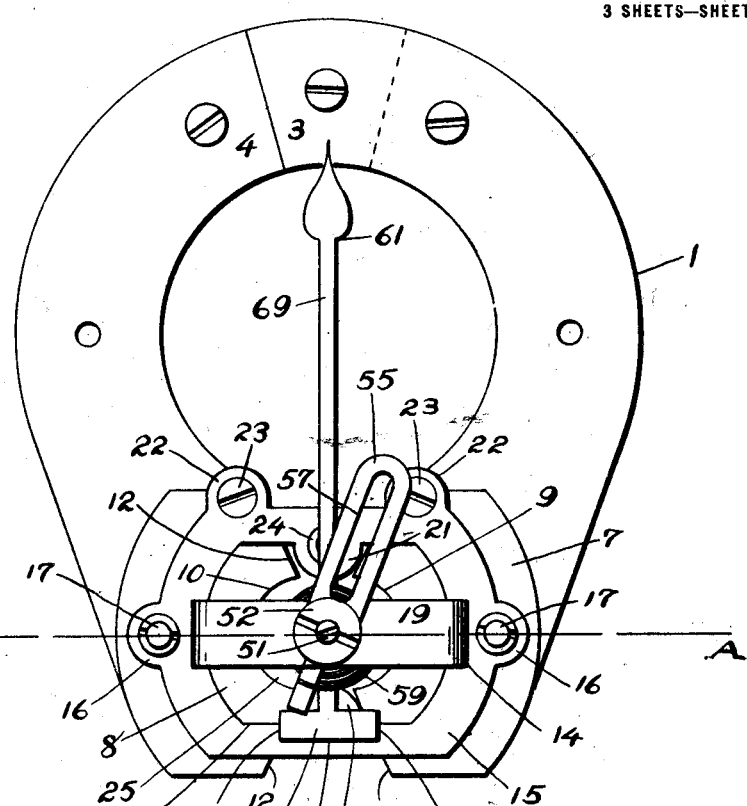
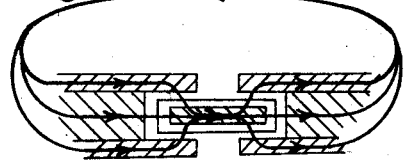
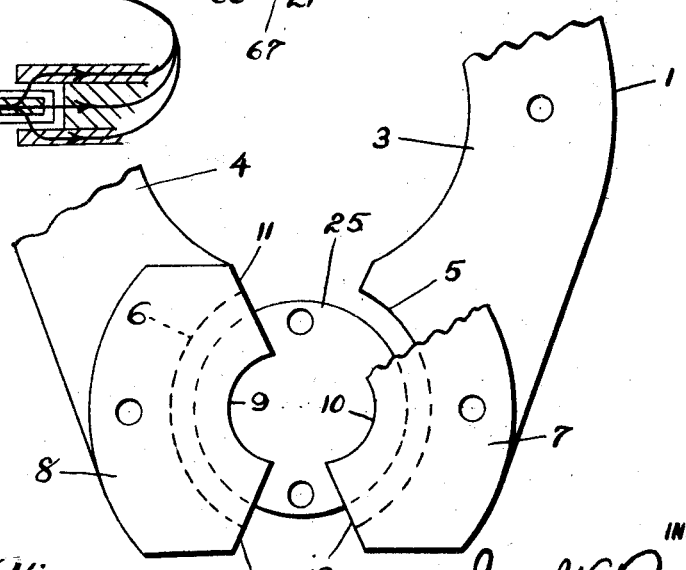

I. W. BRÖGGER.
ELECTRICAL MEASURING INSTRUMENT.
APPLICATION FILED MAR. 22, 1913.
1,141,523.
Patented June 1, 1915.
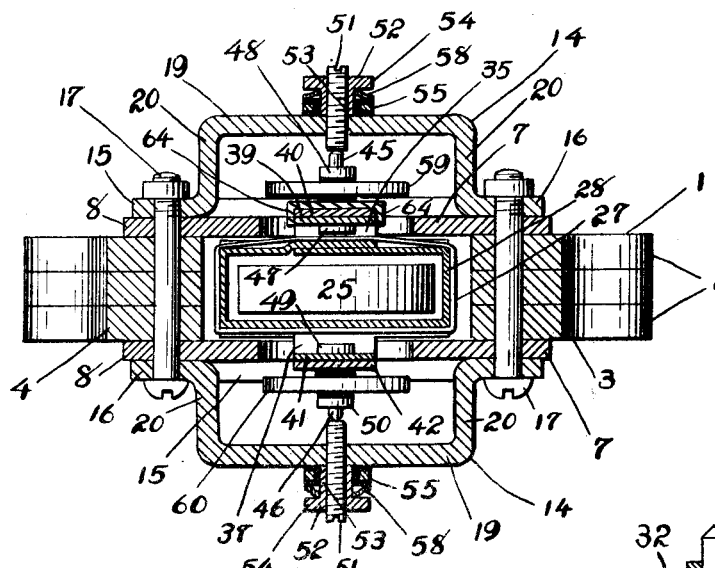
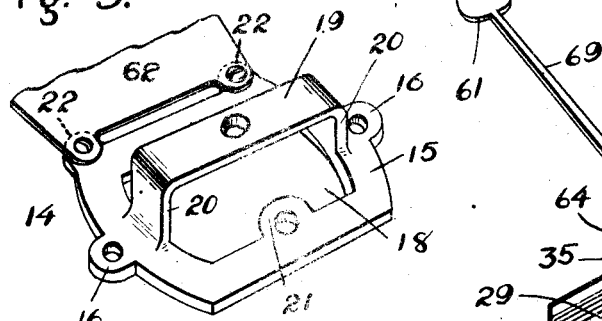
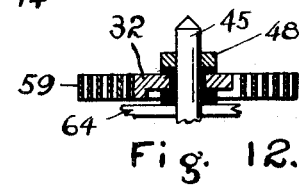
Fig. 12.
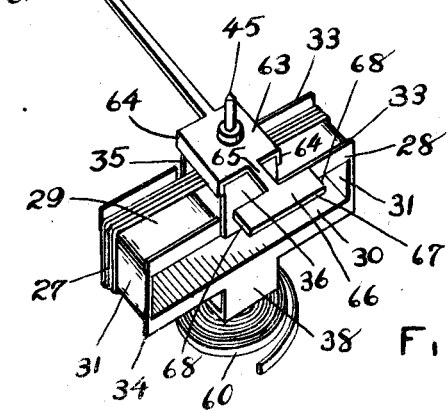
Fig. 4.
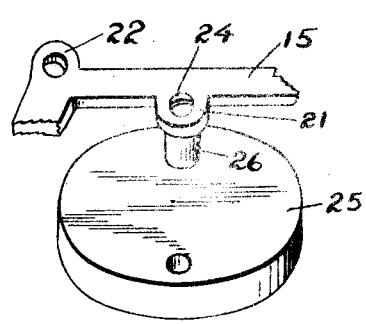
Fig. 6.
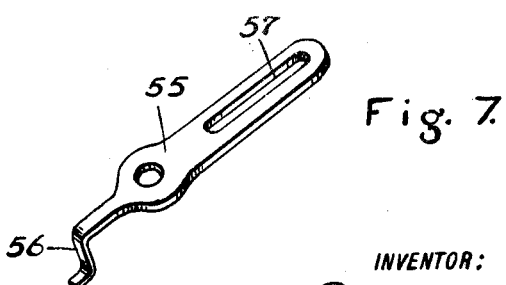
Fig. 7.
WITNESSES:
Howard W. King.
Janet A. Ayers.
INVENTOR:
Ivar W. Brögger,
By Russell W. Everett,
ATTORNEY.

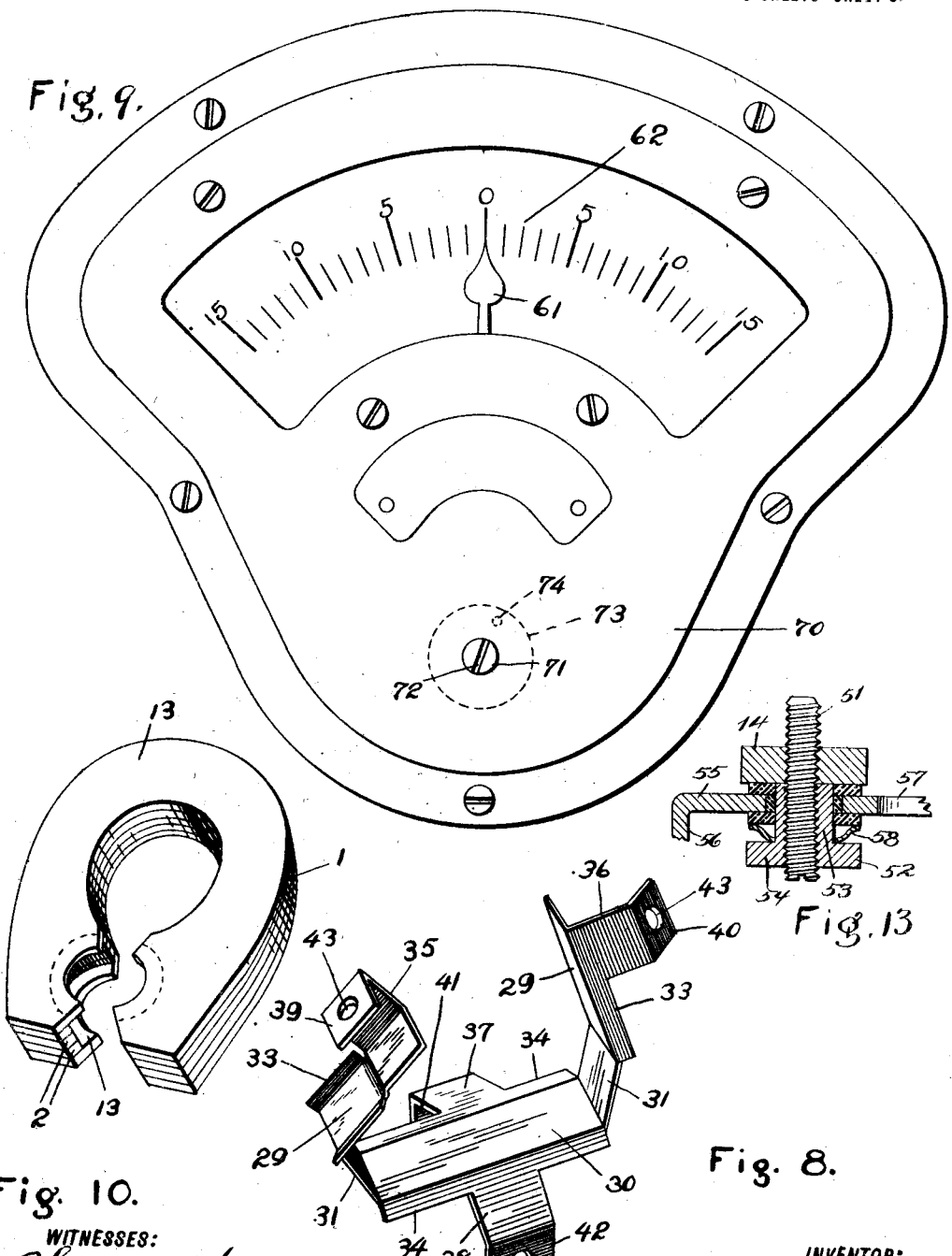

UNITED STATES PATENT OFFICE.

IVAR W. BRÖGGER, OF NEWARK, NEW JERSEY.

ELECTRICAL MEASURING INSTRUMENT.

1,141,523.  Specification of Letters Patent.  Patented June 1, 1915.

Application filed March 22, 1913. Serial No. 755,143.

*To all whom it may concern:*

Be it known that I, IVAR W. BRÖGGER, a subject of the Kingdom of Norway, residing at Newark, in the county of Essex and State of New Jersey, have invented certain Improvements in Electrical Measuring Instruments, of which the following is a specification.

This invention relates to electrical measuring instruments of the D'Arsonval type having a coil pivotally mounted in a magnet field with two spiral springs to conduct the current into and out of the coil and providing the resistance to swinging of said coil.

It is understood that in order to produce an instrument of the above type of high quality, the torque, which is produced by the magnetic lines of force and the limited amount of current allowed to pass through the coil winding, must be as great as possible, also the damping action produced by the magnetic lines and the closed frame when the latter swings in the field must be as near perfect as possible. A high torque enables the use of strong controlling springs on which the accuracy and durability of the instrument to a great extent depend, and also the attainment of other desirable features such as high resistance or a low drop instrument or a temperature-compensated milli-voltmeter or ammeter, all features which are greatly appreciated by users of instruments of the above type, as they are the basis for great accuracy and economy of operation. Such torque and damping are secured by such a relation of the magnet and the movable coil to each other as that the greatest possible number of magnetic lines can be brought to act on the windings to produce torque and on the coil frame to produce the damping effect by means of the eddy currents induced in the frame. Furthermore, it is important to utilize to the fullest extent the whole length of the windings on the coil for producing the torque in order to make the ratio of the weight of the windings to the torque they produce, when current is passing, a minimum. Or, in other words, since the ohmic resistance of the windings determines the amount of current flowing through them, a certain potential being given, the best results are obviously obtained when every unit length of the windings produces part of the total torque, when current is passing, or in other words the ratio of watts dissipated in the windings to torque produced should be a minimum.

The objects of the invention, therefore, are to enable a magnet to be used whose thickness in a direction perpendicular to the plane of the magnet is less than its width or dimension in the plane of the magnet; to thereby reduce the inside area of the magnet and decrease the leakage flux; to reduce the useless field or stray lines of force between the poles of the magnet outside the coil by means of magnetic conductors; to increase the efficiency of the coil by subjecting its whole circumference to the action of the magnetic lines of force and producing a more efficient damping action on the coil due to the eddy currents generated in the closed coil frame; to reduce the reluctance of the magnetic path between the poles by the increase of area through which lines of force pass from one pole to the other; to thus obtain greater permanency of the magnetic field, and increased efficiency of the magnet; to further reduce this reluctance by a core mounted inside the coil in the plane of the magnet; and extending in between the magnetic conductors; to secure a uniform scale, with equal divisions or graduations, by means of the detail shape of said magnetic conductors; to enable the core to be supported from opposite sides by the opposite bridges for holding the coil; to secure an improved frame for the coil, which can be stamped and folded from sheet metal or otherwise formed, with improved means for mounting pivots on the frame; to provide improved means for balancing the indicator; to provide improved means for securing the indicator in non-rotatable relation to the coil; to reduce the cost and difficulty of manufacture; to secure at the same time great accuracy and durability, and to obtain other advantages and results some of which may be hereinafter brought out.

Referring to the accompanying drawings, in which like numerals of reference indicate the same parts throughout the several views, Figure 1 is a plan of my improved instrument with the casing removed; Fig. 2 is a plan of the poles of the magnet with a core between and showing magnetic conductors applied to the magnet, one of them being partly broken away to show the construction more clearly; Fig. 3 is a section of the instrument on line A—A of Fig. 1; Fig. 4 shows the coil and indicator removed; Fig. 5 is a perspective view of one of the bridges; Fig. 6 is a detail view illustrating the mounting of the core upon the bridges; Fig. 7 is a detail perspective of a spring-supporting arm for adjusting the indicator; Fig. 8 is a perspective view of the coil frame partly folded into final shape; Fig. 9 is a plan of the measuring instrument complete, in its case; Fig. 10 is a view of a modified form of magnetic conductor applied to a magnet; Fig. 11 is a section of the magnet and core corresponding to Fig. 3 showing diagrammatically the path of the magnetic lines; Fig. 12 is a view of the mounting of one of the coil springs on a pivot pin of the moving coil frame, showing the same in central section at right angles to the section shown in Fig. 3 and on larger scale, and Fig. 13 is a view of the mounting for the pivot screw and tension lever on one of the bridges, showing the same in central section at right angles to the section shown in Fig. 3 and on larger scale.

In said drawings, $i$ indicates a magnet of the horseshoe type, although it might be of other forms, and preferably this magnet is formed of layers or laminations 2 each of which is in turn formed of unequal sections or plates 3 and 4, the plates of different layers breaking joints as indicated in Fig. 1. This is done to facilitate assembling and enabling warping to be corrected but the layers may also be made continuous. The poles of the magnet are at their adjacent faces recessed or curved concavely, in plan, preferably on the arc of a circle, as at 5, 6 in Fig. 2, and at both its upper and lower sides the magnet is provided at said poles with magnetic conductors 7, 8 projecting toward each other beyond the two poles, and preferably concavely curved at the middle portions of their adjacent edges, as at 9, 10 and having said edges receding at both ends of the curve as at 11, 11 and 12, 12. These magnetic conductors may be located only at the poles of the magnet, as shown in Figs. 1, 2 and 3, or they may extend over the entire upper and lower surfaces of the magnet and form additional layers or laminations therefor, as shown at 13, 13, in Fig. 10, and can be made of magnet steel or soft steel according to whether the one or the other is wanted.

It will be noted that the receding end edges 11, 12, of the magnetic conductors, are shown flush with the corresponding receding end portions of the pole faces, see Fig. 2 of the drawings more especially. The effect of this construction is that the receding portions of the pole faces are widely separated so that there is only a little leakage between them, while the more closely approaching points of the magnetic conductors have no great thickness and therefore the leakage is small. By the construction of poles and magnetic conductors described, substantially the same amount of metal is provided for conducting lines of force to be traversed by the moving coil hereinafter described whatever the angular position of said moving coil may be. In other words, the moving coil is traversed by substantially the same number of lines of force whatever its angular position, due to the middle curved portions and outwardly diverging end portions of the pole faces and edges of the magnetic conductors which I have described herein.

On both top and bottom of the magnet, outside the magnetic conductors, are secured bridges 14, 14, which are similar to each other although oppositely arranged, of course. Each of these bridges comprises a non-magnetic plate-like body 15, of sheet metal or made as a die casting and having apertured ears 16, 16 at its opposite ends to rest upon the magnetic conductors 7, 8, and receive bolts 17, 17 extending through said ears 16, 16 of both bridges, both the upper and lower magnetic conductors 7, 8 and the magnet 1, to secure all of said parts together. The body 15 of each bridge is cut away centrally of itself, forming an opening 18, and spanning this opening in the direction of a line connecting the ears 16, 16 is a portion 19 preferably formed as part of the plate 15 and held, by bent ends 20, 20, spaced from the body 16 in parallel relation thereto, within the opening 18, and upon a center line perpendicular to the center line through the ears 16, 16, is a pair of similar ears 21, 21, and at the ends of that outer edge of the body 15 which is toward the closed end of the horseshoe magnet 1, are spaced ears 22, 22 to receive screws 23, for holding the scale plate.

Through the ears 21, 21 of both upper and lower bridges extend bolts 24, 24, which also extend through a preferably disk-like core 25 thus held in proper position between the poles of the magnet. Said core is rigidly held spaced from the bridges 14, 14 by means of sleeves 26, 26 upon the bolts 24, 24 and between the bridges and core upon opposite sides thereof. The sleeves 26, 26 may also serve to locate the magnet in assembling it with the unit consisting of core, coil and bridges held together by the bolts 24, 24, and act also as stops for the frame in its extreme positions, the necessity of using cushion springs or the like for preventing the pointer from swinging too far being thereby eliminated. By using a die casting for the bridges 14, 14 the sleeves 26, 26 may be dispensed with, as lugs can be formed on the bridges which will serve the purpose of the sleeves 26, 26.

The core 25 is preferably of a magnetic conducting material whereby it will form a path for the lines of force between the adjacent poles of the magnet, in order to secure the best possible results from the instrument. It will be understood, however, by those skilled in the art that this core could be made of non-magnetic material or indeed could be omitted entirely, and the instrument would still work although in a very inferior way. A coil 27 extends around the core 25, in a plane transverse thereto, so as to swing between said core and the poles and magnetic conductors, 7, 8 of the magnet, and is pivotally supported from the bent-up portions 19, 19 of the bridges, as will be hereinafter described. Said coil is formed of wire wound upon a frame 28 which constitutes one of the features of my invention. The blank for this frame, as best shown in Figs. 8, 4 and 3, is preferably stamped out of a single piece of sheet material, and afterward bent into the desired form and preferably soldered at the over-lapping end. When so bent it provides two parallel sides 29, 30 held in spaced relation to each other by means of the ends 31, 31, so that a rectangular frame is provided, around which the wire is wound in the plane of the frame. In order to prevent the wire of the coil from slipping laterally off the frame, retaining flanges 33, 34 are bent up at the edges of the parallel sides 29, 30. I also provide supporting extensions projecting from the opposite sides of the frame and each comprising wings 35, 36 or 37, 38 projecting from the longitudinal edges of both parallel sides 29, 30 or the flanges 33, 34 thereof, said wings being equidistant from the ends of the frame. The outer ends of each pair of wings are preferably bent inward at substantially right angles to superpose one upon the other, as at 39, 40 or 41, 42, said over-lapping ends being preferably apertured as at 43, or 44 for the introduction of a pivot pin 45 or 46 secured thereon to the frame by any suitable means, such as inner and outer nuts 47, 48 or 49, 50, at opposite sides of the parts upon said pin and clamping the same together.

In order to pivotally support the frame 28, a screw 51 is provided centrally in each of the bent up portions 19, 19 of the bridges 14, 14, it being understood that said screws 51, 51 are in axial alinement with and adapted to pivotally receive the ends of the pivot pins 45, 46 of the coil. Friction may be reduced between the screws 51 and the pivot pins by use of jewels (not shown) in the ends of the screws, as is old and well-known in the art, and which construction I preferably employ. Surrounding each of the screws 51 is a lock nut 52, outside the bridge 14, which lock nut has a reduced portion 53 for spacing the head 54 away from the bent up portion 19 of the bridge and upon each of the said reduced portions 53, and insulated therefrom as well as from the bridge 14, is a tension lever 55 adapted to be swung in a plane perpendicular to the axis of the coil and having one end bent inward toward the magnet substantially parallel to said axis, as at 56, and having its other end provided with a longitudinal slot 57. In order to frictionally retain said levers in desired angular position, I place on the reduced portion 53 of each lock nut 52, between its head 54 and the tension lever 55, a spring washer 58, said washer and tension lever being insulated one from the other as shown. The tension levers 55, 55, are connected with the terminals of the instrument in any suitable and well-known manner, not shown.

It may here be noted that the disk-shaped core 25 is supported in axial alinement with the pivot pins 45, 46 of the coil frame and screws 51 pivotally supporting the same, and also at the centers of the openings 18, 18 of the bridges 14, 14. The frame 28 supporting the wire coil 27 is constructed so that the air gap between it, the pole faces, and the magnetic conductors, is the least possible permitting the coil to swing without obstruction. Similarly the disk-shaped core 25 is shaped so as to minimize the air space between itself and the coil 27, without obstructing the free swing of the latter.

Spiral springs 59, 60 coiled flat like clock springs, are supported upon opposite sides of the frame 28 by having their inner ends secured fixedly to insulated terminals 32 upon the pivot pins 45, 46, said terminals being clamped in fixed relation to the core frame by the nuts 48 and 50. The inner ends of said springs have the extremities of the coil wire connected thereto, and the outer ends of said springs 59, 60 are secured, as by soldering, each to the bent down portion 56 of the adjacent tension lever 55. These springs 59, 60 thus lie in planes substantially perpendicular to the axial line upon which the coil 27 swings and their tension is adjusted so as to normally hold said coil in its zero position when no current is passing through the coil. Not only do the coil springs 59, 60 thus hold the coil, but at the same time they constitute connections for leading a current from the terminals of the instrument through the coil. Thus by connecting the terminals of the instrument with a source of electro-motive force, the current will flow through the windings of the coil, and said coil will be deflected according to the amount of current, affording a measure of it.

Upon the pivotal pin 45 at the upper side of the coil I place a pointer or indicator 61, projecting toward the closed end of the magnet 1 and adapted to indicate upon a scale 62 the movements of the coil. This pointer is arranged upon the pin 45 between the folded wing ends 39, 40 of the frame and the terminal 32 to which is fastened the inner end of the coiled spring 59, and is widened at opposite sides of the pin 45 as at 63, (see Fig. 4), and provided with flanges 64, 64 bent down over the edges of said folded flaps 39, 40 to prevent twisting of the pointer with respect to the coil-frame. The rear end or short arm 65 of the pointer 61 has a transverse counter balance 66 which can be reduced at its rear edge 67 or either of its lateral end edges 68, 68, as by clipping or filing, to secure a balanced condition of the indicator or pointer 61, moving coil 27 and frame 28 pivoted between the screws 51, 51. The other arm 69 of said pointer overlies the scale 62, and said scale is in my improved construction made with equal graduations, or division lines equidistant from one another, which conduces to the greatest ease and accuracy in producing said markings mechanically by means of a printing device. To enable such equal graduations the action of the lines of force on the coil when current is passing through the latter must be of constant magnitude regardless of the different angular positions of the coil so that the deflection is directly in proportion to the current. In other words, the torque produced by the lines of force between the poles of the magnet which are cut by the coil must not differ in angular position of the coil, and I accomplish this by shaping the curves 9, 10 of the magnetic conductors, either semi-elliptical as shown, with the major axis of the ellipse extending from the center of one pole of the magnet to the center of the other or otherwise as found desirable. By this construction the inevitable leakage at the corners of the magnet poles, weakening the active field at these points, is compensated for by the magnetic conductors projecting farther over the coil and core at the corners than at the middle of the poles and thereby strengthening the field where the magnetic leakage tends to weaken it. A uniform action between field and the current through the coil is thus insured for all positions of the coil. It can readily be seen that also other scale characteristics can be obtained with my construction as for instance a scale with divisions narrower at the ends and wider in the center and vice versa. Also an increment or decrement of scale division from one end of the scale to the other can be obtained by properly sloping the magnetic conductors. When a uniform scale is desired in instruments as heretofore constructed the length of scale is limited on account of the leakage at the corners, but with my construction a maximum scale deflection can be obtained as the leakage at the corners is compensated for by the aforesaid shape of the magnetic conductors. In all instruments of this type, because of wear, misuse, or climatic conditions, the pointer may not be in exact registration with the zero of the scale when the coil is free from any flow of current. In order to correct this error, I have provided in the casing 70, a pivot or adjusting pin 71, having at its outer or exposed end means whereby it may be turned, such as the slot 72 adapted to receive a screw driver or the like. The opposite or inner end of this pin 71 carries a disk 73 from which projects toward the back of the instrument an eccentrically positioned pin 74, engaging within the slot 57 of the tension lever 55. Turning of the adjusting pin 71 will therefore result in angular swinging of the lever 55 to which is secured one end of the coiled spring 59 and as the other end of said spring 59 is connected with the coil frame and pointer, the pointer may be brought to register with the zero of the scale by the user of the instrument without having to remove the casing.

It should be noted that an important feature of my invention is the construction of bridges 14 to which the core 25 and coil 27 upon its frame may be attached entirely independent of the magnet, so that assembling of the instrument is simplified and cheapened. Similarly it will be noted that the simplicity of parts and their adaptation to be made by inexpensive processes, and yet at the same time so as to be accurate, durable and interchangeable, are marked advantages of this instrument; and as the section and laminations of the magnet 1 may be magnetized separately just as well as after assembly, the process of manufacture of the magnet is cheapened and facilitated.

Various changes may be made, by those skilled in the art, from the detail construction which I have positively shown and described, and I do not wish therefore, to be understood as limiting myself thereto. For instance, instead of forming the magnet and magnetic conductors of the identical pieces I have shown, they can be built up in any other suitable way.

Having thus described the invention, what I claim is—

1. In an electrical measuring instrument, a magnet with adjacent poles, a moving coil between said poles, a core within said moving coil, and magnetic conductors projecting toward each other from the facing sides of the poles above and below said moving coil and having their adjacent edges concavely curved so that the moving coil is traversed by substantially the same number of lines of force in different angular positions.

2. In an electrical measuring instrument, a magnet with adjacent poles, a moving coil between said poles, and magnetic conductors projecting toward each other from the facing sides of the poles above and below said moving coil and having their adjacent edges concavely curved at their middle portions and inclined outwardly apart at their end portions.

3. In an electrical measuring instrument, a magnet with adjacent poles having facing sides curved in the plane of the magnet, a moving coil between said poles, a core within said moving coil, and magnetic conductors projecting toward each other from said facing sides of the poles above and below said moving coil and having their edges concavely curved so that the moving coil is traversed by substantially the same number of lines of force in different angular positions.

4. In an electrical measuring instrument, a magnet with adjacent poles having facing sides curved in the plane of the magnet, a moving coil between said poles, and magnetic conductors projecting toward each other from said facing sides of the poles above and below said moving coil and having their edges concavely curved at their middle portions and inclined outwardly apart at their end portions.

5. In an electrical measuring instrument, a magnet with adjacent poles having facing sides concavely curved at their middle portions and inclined outwardly apart at their end portions, a moving coil between said curved portions of the facing sides of the poles, and magnetic conductors projecting toward each other from said facing sides of the poles above and below said moving coil and having their edges concavely curved at their middle portions and inclined outwardly apart at their end portions in substantially the planes of the said inclined end portions of the pole faces.

6. In an electrical measuring instrument of the character described, the combination with a magnet having facing poles, a core between said poles and a moving coil rotatably arranged between said poles and core with a substantially uniform air-gap, of magnetic conductors projecting from the opposite sides of the magnet beyond the faces of said poles and overlying said coil, the amount of such projection varying at different points along the face of the poles so as to regulate the action of the lines of force on the coil in different angular positions of the latter.

7. In an electrical measuring instrument of the character described, the combination with a magnet having facing poles, a core between said poles and a moving coil rotatably arranged between said poles with a substantially uniform air-gap, of magnetic conductors projecting from the opposite sides of the magnet beyond the faces of said poles and over-lying said coil, the amount of such projection being least at the middle of the pole faces and increasing toward both ends so as to secure a constant action of the field on the coil regardless of the angular position of the latter.

8. In an electrical measuring instrument, the combination with a magnet, of opposite bridges extending from one pole to the other at the top and bottom of the magnet, a moving coil mounted in said bridges entirely between the same, a core within said moving coil, means for attaching said core at opposite points to said bridges, and means for securing said bridges to said magnet.

9. In an electrical measuring instrument, the combination with a magnet, of opposite bridges extending from one pole to the other at the top and bottom of the magnet, means securing said bridges in fixed relation to each other independently of the magnet, a moving coil mounted in said bridges entirely between the same, and means for securing said bridges to the magnet.

10. In an electrical measuring instrument, the combination with a magnet, of opposite bridges extending from one pole to the other at the top and bottom of the magnet, a moving coil mounted entirely between said bridges, a core within said moving coil, means midway between the poles for attaching said core to said bridges, and means for securing said bridges to the magnet.

11. In an electrical measuring instrument, the combination with a magnet, of opposite bridges extending from one pole to the other at the top and bottom of the magnet, a moving coil entirely between said bridges, a core within said moving coil, bolts extending through said bridges and core substantially in a line through the axial line of the moving coil and midway between the poles, and sleeves on said bolts between said core and bridges holding the core in spaced relation to the bridges.

12. In an electrical measuring instrument, the combination with a magnet of a frame comprising upper and lower parallel portions, wings projecting from opposite edges of both said parallel portions at substantially right angles thereto each pair of wings having its ends bent toward each other and over-lapping, a coil wound on said frame, means upon said over-lapping wing ends for pivotally mounting the frame and bridges on the magnet adapted to receive said mounting means.

13. In an electrical measuring instrument, the combination with a magnet, of a frame comprising opposite upper and lower portions, wings projecting from the opposite edges of both said portions away from the frame, and each pair having its ends bent toward each other and over-lapping, a coil wound on said frame between the ears of each pair, pivot pins mounted in said overlapping ends of the wings and projecting oppositely away from the frame in alinement with each other, and bridges on the magnet for receiving said pivot pins.

14. In an electrical measuring instrument, the combination with a magnet, of a moving coil frame having at its opposite upper and lower sides projecting transverse bridge-like portions, a pointer or indicator having a middle portion lying flatwise upon the upper bridge-like portion of the frame and bent down over the lateral edges of the same, means on said bridge-like portions of the frame for pivotally mounting the same, and means on the magnet for receiving said mounting means.

15. In an electrical measuring instrument, the combination with a magnet, of a moving coil frame having a coil wound thereon, said frame having at its upper and lower sides supports which project over the winding at a distance therefrom, means on said supports for pivotally mounting the frame, and bridges for receiving said pivotal mounting means and connecting the moving coil to the magnet.

16. In an electrical measuring instrument of the character described, the combination with a magnet having facing poles providing slots with bottoms curved in the plane of the magnet, and a moving coil arranged between said poles in said slots.

17. In an electrical measuring instrument, the combination with a magnet, of opposite bridges extending from one pole to the other at the top and bottom of the magnet, means securing said bridges in fixed relation to each other, a moving coil mounted in said bridges between the same, a pointer carried by said moving coil, a scale plate mounted on one of said bridges, and means for securing said bridges to the magnet, whereby the moving coil, pointer and scale plate can by detaching the bridges from the magnet be removed without disturbing their relation to one another.

18. In an electrical measuring instrument, the combination with a magnet, of opposite bridges extending from one pole to the other at the top and bottom of the magnet, means securing said bridges in fixed relation to each other, a moving coil mounted in said bridges between the same, a pointer carried by said moving coil, and means for securing said bridges to the magnet, whereby the moving coil and pointer can by detaching the bridges from the magnet be removed without disturbing their relation to said bridges.

19. In an electrical measuring instrument, the combination with a magnet, of opposite bridges extending from one pole to the other at the top and bottom of the magnet, a core between said bridges, means securing said bridges in fixed relation to said core, a moving coil mounted entirely between said bridges and inclosing said core, and means for securing said bridges to the magnet.

20. In an electrical measuring instrument, the combination with a magnet, of opposite bridges extending from one pole to the other at the top and bottom of the magnet, a moving coil between said bridges having a projecting pivot pin, a screw in one of said bridges for said pivot pin, a headed lock-nut on said screw for locking the same, a tension lever pivoted on the shank of said lock-nut, a spring secured at one end to said tension lever and at the other end to said pivot pin, and a spring washer on the shank of said lock-nut adapted to press resiliently against the tension lever when said lock-nut is seated rigidly against the bridge.

21. In an electrical measuring instrument, the combination with a magnet having adjacent poles, a core between said poles, bridges mounted upon opposite sides of said core in spaced relation thereto, a moving coil mounted entirely between said bridges and inclosing said core, and means for securing said bridges to the magnet.

IVAR W. BRÖGGER.

Witnesses:
HOWARD P. KING,
MILDRED E. BROOKS.